United States Patent
Chen

(10) Patent No.: US 10,522,097 B2
(45) Date of Patent: Dec. 31, 2019

(54) METHOD AND DEVICE FOR DISPLAYING IMAGE ON LIQUID CRYSTAL PANEL

(71) Applicants: Analogix (China) Semiconductor, Inc., Beijing (CN); Analogix International LLC, Wilmington, DE (US)

(72) Inventor: Adam Chen, Beijing (CN)

(73) Assignees: Analogix (China) Semiconductor, Inc., Beijing (CN); Analogix International LLC, Wilmington, DE (US)

( * ) Notice: Subject to any disclaimer, the term of this patent is extended or adjusted under 35 U.S.C. 154(b) by 67 days.

(21) Appl. No.: 15/650,385

(22) Filed: Jul. 14, 2017

(65) Prior Publication Data
US 2018/0336850 A1    Nov. 22, 2018

(30) Foreign Application Priority Data
May 19, 2017   (CN) .......................... 2017 1 0358745

(51) Int. Cl.
*G09G 3/34*  (2006.01)
*G02F 1/133*  (2006.01)
*G09G 3/36*  (2006.01)
*G09G 3/20*  (2006.01)

(52) U.S. Cl.
CPC .......... *G09G 3/3426* (2013.01); *G02F 1/133* (2013.01); *G09G 3/2018* (2013.01); *G09G 3/3648* (2013.01); *G09G 2340/16* (2013.01)

(58) Field of Classification Search
CPC .. G09G 3/3426; G09G 3/2018; G09G 3/3648; G09G 2340/16; G02F 1/133
See application file for complete search history.

(56) References Cited

U.S. PATENT DOCUMENTS

| | | | | |
|---|---|---|---|---|
| 5,107,354 A | * | 4/1992 | Yamazaki | ............. G09G 3/3629 345/96 |
| 2002/0138592 A1 | * | 9/2002 | Toft | .................... H04N 21/8173 709/219 |
| 2004/0000913 A1 | * | 1/2004 | Raichle | ............. H01M 10/4285 324/426 |
| 2006/0170763 A1 | * | 8/2006 | Kawamura | ............ H04N 7/147 348/14.09 |
| 2006/0290651 A1 | * | 12/2006 | Verhaegh | .......... G02F 1/133555 345/107 |
| 2008/0276204 A1 | * | 11/2008 | Lowles | ................ G09G 3/3208 715/867 |

* cited by examiner

Primary Examiner — Mark W Regn
(74) Attorney, Agent, or Firm — Cozen O'Connor

(57) ABSTRACT

Disclosed are a method and a device for displaying an image on a liquid crystal panel. The method includes: controlling a timing controller to load a pre-set image from a pre-programmed memory after the liquid crystal panel is powered on, wherein the liquid crystal panel comprises the timing controller, the timing controller is connected with the memory; judging whether the pre-set image is valid; and controlling the liquid crystal panel to display the pre-set image until an external source image is received when the pre-set image is valid. The disclosure solves the technical problem in the related art that a liquid crystal panel cannot display any image before an external system provides an external source image.

14 Claims, 2 Drawing Sheets

METHOD AND DEVICE FOR DISPLAYING IMAGE ON LIQUID CRYSTAL PANEL

CROSS REFERENCE TO RELATED APPLICATION

The application claims the priority of Chinese patent application 201710358745.9, entitled "method and device for displaying image on liquid crystal panel" filed to the State Intellectual Property Office of the People's Republic of China on May 19, 2017, the entire contents of which are incorporated herein by reference.

TECHNICAL FIELD

The disclosure relates to the field of display technology, in particular to a method and a device for displaying an image on a liquid crystal panel.

BACKGROUND

Liquid crystal panels typically consist of 3 main parts, a glass that holds liquid crystal that forms an image, source and gate drivers that use voltages to drive the liquid crystal, and a timing controller that receives signals from a system and coordinates the outputs of the drivers. Liquid crystal panels are passive devices, and they only display what the system sends to them for display. The system may be a graphics card, a CPU or an embedded controller. In a typical application like a laptop computer, the GPU in the computer will send display information to a screen (panel). Even in an unconnected computer monitor, the liquid crystal panel may show a startup image that is produced by the controller built inside the monitor (also known as a scalar). Therefore, before the system provides an external source image, the liquid crystal panel cannot display any image.

Any effective solution has not been proposed yet at present for the problem in the related art that a liquid crystal panel cannot display any image before an external system provides an external source image.

SUMMARY

Embodiments of the disclosure provide a method and a device for displaying an image on a liquid crystal panel, intended to at least solve the technical problem in the related art that a liquid crystal panel cannot display any image before an external system provides an external source image.

According to an aspect among the embodiments of the disclosure, a method for displaying an image on a liquid crystal panel is provided. The method includes: controlling a timing controller to load a pre-set image from a pre-programmed memory after the liquid crystal panel is powered on, wherein the liquid crystal panel includes the timing controller, the timing controller is connected with the memory; judging whether the pre-set image is valid; and controlling the liquid crystal panel to display the pre-set image until an external source image is received when the pre-set image is valid.

According to another aspect among the embodiments of the disclosure, a device for displaying an image on a liquid crystal panel is also provided. The device includes: the liquid crystal panel and a pre-programmed memory, wherein, the liquid crystal panel includes a timing controller, the timing controller is connected with the memory, the device further includes: a first control module, configured to control the timing controller to load a pre-set image from the memory after the liquid crystal panel is powered on; a first judgment module, configured to judge whether the pre-set image is valid; and a second control module, configured to control the liquid crystal panel to display the pre-set image until an external source image is received when the pre-set image is valid.

In the embodiments of the disclosure, after the liquid crystal panel is powered on, the timing controller is controlled to load the pre-set image from the memory; it is judged whether the pre-set image is valid; when the pre-set image is valid, the liquid crystal panel is controlled to display the pre-set image until the external source image is received. The purpose of displaying image before an external source image of an external system is received is fulfilled, so the technical effects of switching a passive liquid crystal panel to an active liquid crystal panel and improving the visual experience of a user are achieved, thus solving the technical problem in the related art that a liquid crystal panel cannot display any image before an external system provides an external source image.

BRIEF DESCRIPTION OF THE DRAWINGS

The drawings forming a part of the disclosure are adopted to provide further understanding of the disclosure, and the schematic embodiments and description of the disclosure are adopted to explain the disclosure, and do not form improper limits to the disclosure. In the drawings.

DETAILED DESCRIPTION OF THE EMBODIMENTS

Figure 1:
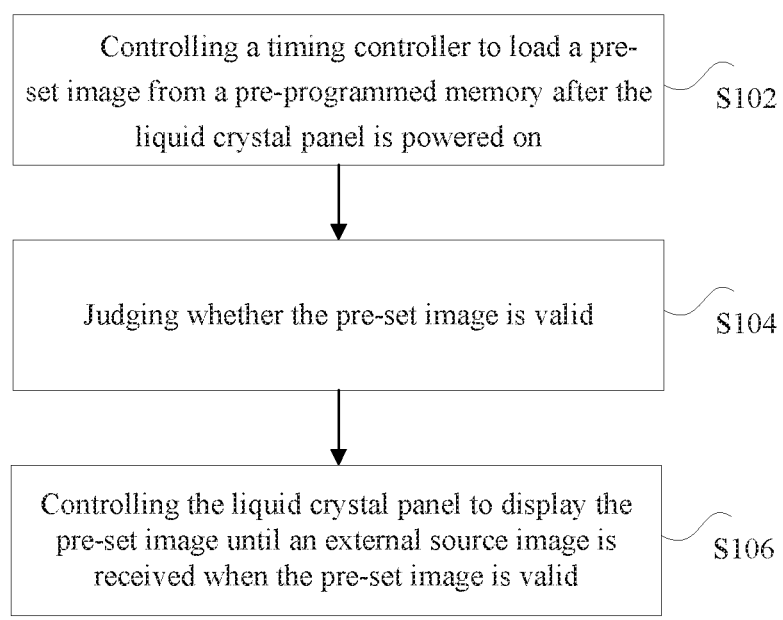
FIG. 1 is a flowchart of a method for displaying an image on a liquid crystal panel according to an embodiment of the disclosure.

In order to make a person skilled in the art better understand the solutions of the disclosure, the technical solutions in the embodiments of the disclosure will be clearly and completely described hereinbelow with reference to the drawings in the embodiments of the disclosure. Obviously, the described embodiments are only a part of the embodiments of the disclosure, not all of the embodiments. On the basis of the embodiments in the disclosure, all other embodiments obtained on the premise of no creative work of a person skilled in the art should fall within the scope of protection of the disclosure.

It is important to note that the description and claims of the disclosure and terms 'first', 'second' and the like in the drawings are used for distinguishing similar objects instead of distinguishing a specific sequence or a precedence order. It will be appreciated that data used in such a way may be exchanged under appropriate conditions, in order that the embodiments of the disclosure described here can be implemented in a sequence other than sequences graphically shown or described here. In addition, terms 'include' and 'have' and any inflexions thereof are intended to cover non-exclusive inclusions. For example, it is not limited for processes, methods, systems, products or equipment containing a series of steps or units to clearly list those steps or units, and other steps or units which are not clearly listed or are inherent to these processes, methods, products or equipment may be included instead.

Embodiment 1

According to the embodiment of the disclosure, a method embodiment of a method for displaying an image on a liquid crystal panel is provided. Moreover, although a logic sequence is shown in the flowchart, the shown or described steps may be executed in a sequence different from the sequence here under certain conditions.

FIG. 1 is a method for displaying an image on a liquid crystal panel according to an embodiment of the disclosure. As shown in FIG. 1, the method includes the steps as follows.

Step S102: controlling a timing controller to load a pre-set image from a pre-programmed memory after the liquid crystal panel is powered on, wherein the liquid crystal panel includes the timing controller, the timing controller is connected with the memory.

Specifically, after the liquid crystal panel is powered on, the timing controller loads relevant display settings from the memory. In the related art, after the relevant display settings are loaded, the liquid crystal panel directly displays a black screen. In the disclosure, the timing controller also needs to load the pre-set image in addition to the relevant display settings from the memory.

Step S104: judging whether the pre-set image is valid.

Step S106: controlling the liquid crystal panel to display the pre-set image until an external source image is received when the pre-set image is valid.

Specifically, after the liquid crystal panel is powered on for a short time, the timing controller may display the pre-set image without waiting for any system booting, and the method for displaying an image on the liquid crystal panel in the disclosure does not need to be controlled by an external system or a user, the system can be a graphics card, a CPU or an embedded controller.

By means of Step S102 to Step S106, after the liquid crystal panel is powered on, the timing controller is controlled to load the pre-set image from the memory; it is judged whether the pre-set image is valid; if the pre-set image is valid, the liquid crystal panel is controlled to display the pre-set image until the external source image is received. The purpose of displaying image before an external source image of an external system is received is fulfilled, so the technical effects of switching a passive liquid crystal panel to an active liquid crystal panel and improving the visual experience of a user are achieved, thus solving the technical problem in the related art that a liquid crystal panel cannot display any image before an external system provides an external source image.

In an alternative embodiment, since the liquid crystal panel may also display the pre-set image in case of the system shutdown or power-off, the pre-set image may be a certain identifier. Therefore, the liquid crystal panel of the disclosure may be configured to indicate an error situation or used as a power indicator.

In an alternative embodiment, after Step S104 of judging whether the pre-set image is valid, the method further includes: Step S102: controlling the liquid crystal panel to display a black screen until the external source image is received when the pre-set image is invalid.

Specifically, if the pre-set image in the memory is invalid or damaged, the liquid crystal panel displays the black screen until the external source image is received.

In an alternative embodiment, when the valid external source image has not been received, the timing controller will control the liquid crystal panel to always display the pre-set image that has been loaded and is valid.

In an alternative embodiment, the memory stores a plurality of pre-set images, the plurality of pre-set images include one factory pre-set image and at least one user pre-set image, the user pre-set image can be loaded in and updated by an end-user, and the factory pre-set image is protected by a password.

Specifically, the factory settings and the factory pre-set image in the memory need to be protected by the password, the user pre-set image does not need to be protected by the password, and the user pre-set image may be configured by the end-user, namely loaded, updated or deleted.

In an alternative embodiment, Step S104 of judging whether the pre-set image is valid includes:

Step S302: judging whether the factory pre-set image and the user pre-set image are valid;

Step S106 of the liquid crystal panel to display the pre-set image until the external source image is received when the pre-set image is valid includes:

Step S402: controlling the liquid crystal panel to display the factory pre-set image until the external source image is received when the factory pre-set image is valid and the user pre-set image is invalid;

Step S404: controlling the liquid crystal panel to display the user pre-set image until the external source image is received when the factory pre-set image is invalid and the user pre-set image is valid;

Step S406: controlling the liquid crystal panel to display the user pre-set image until the external source image is received when the factory pre-set image is valid and the user pre-set image is valid.

In an alternative embodiment, Step S106 of controlling the liquid crystal panel to display the pre-set image until the external source image is received includes: Step S502: controlling the liquid crystal panel to switch displaying the pre-set image among the plurality of pre-set images until the external source image is received.

In an alternative embodiment, after Step S106 of controlling the liquid crystal panel to display the pre-set image until the external source image is received, the method further includes:

Step S602: confirming a display time of the pre-set image;

Step S604: controlling the liquid crystal panel to display the external source image when the display time of the pre-set image exceeds a preset minimum time.

Specifically, by setting the preset minimum time, it may be ensured that the pre-set image is displayed within sufficient time to prevent an image viewed by a viewer from being blurred or flickered.

Here, it is important to note that if the liquid crystal panel receives the external source image and the external source image is valid, the liquid crystal panel is configured to definitely display the external source image after having displayed the pre-set image.

In an alternative embodiment, after Step S604 of controlling the liquid crystal panel to display the external source image, the method further includes:

Step S702: judging whether the external source image is lost;

Step S704: controlling the liquid crystal panel to display the pre-set image when the external source image is lost.

Specifically, when the external source image is lost, the liquid crystal panel is controlled to display the pre-set image. When a valid external source image is received thereafter, the liquid crystal panel displays the valid external source image.

In an alternative embodiment, Step S106 of controlling the liquid crystal panel to display the pre-set image until the external source image is received includes:

Step S802: confirming a display time of the pre-set image;

Step S804: changing a display location of the pre-set image on the liquid crystal panel when the display time of the pre-set image exceeds a preset maximum time.

Embodiment 2

Figure 2:
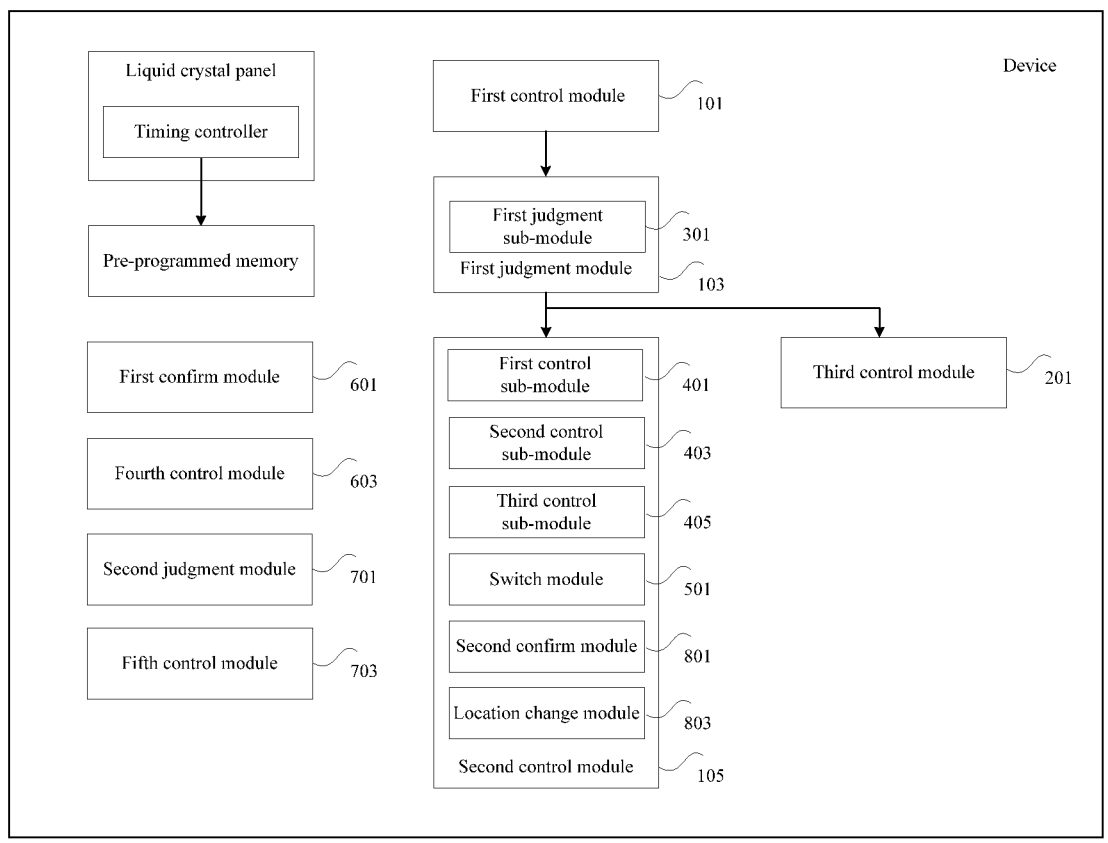
FIG. 2 is a diagram of a device for displaying an image on a liquid crystal panel according to an embodiment of the disclosure.

According to the embodiment of the disclosure, a product embodiment of a device for displaying an image on a liquid crystal panel is provided. FIG. 2 is a device for displaying an image on a liquid crystal panel according to an embodiment of the disclosure. As shown in FIG. 2, the device includes the liquid crystal panel and a pre-programmed memory. The liquid crystal panel includes a timing controller, and the timing controller is connected with the memory. The device further includes a first control module 101, a first judgment module 103 and a second control module 105, wherein the first control module 101 is configured to control the timing controller to load a pre-set image from the memory after the liquid crystal panel is powered on; the first judgment module 103 is configured to judge whether the pre-set image is valid; the second control module 105 is configured to control the liquid crystal panel to display the pre-set image until an external source image is received when the pre-set image is valid.

In the embodiment, after the liquid crystal panel is powered on, the first control module 101 controls the timing controller to load the pre-set image from the memory; the first judgment module 103 judges whether the pre-set image is valid; when the pre-set image is valid, the second control module 105 controls the liquid crystal panel to display the pre-set image until the external source image is received. The purpose of displaying image before an external source image of an external system is received is fulfilled, so the technical effects of switching a passive liquid crystal panel to an active liquid crystal panel and improving the visual experience of a user are achieved, thus solving the technical problem in the related art that a liquid crystal panel cannot display any image before an external system provides an external source image.

Here, it is important to note that the first control module 101, the first judgment module 103 and the second control module 105 correspond to Step S102 to Step S106 in embodiment 1, and the modules are identical to examples and application scenarios for implementing the corresponding steps, but unrestricted to those disclosed in embodiment 1.

Here, it is also important to note that the first control module 101, the first judgment module 103 and the second control module 105 may be modules on the timing controller or may be integrated on other terminals or modules.

In an alternative embodiment, the device further includes a third control module 201, configured to control the liquid crystal panel to display a black screen until the external source image is received when the pre-set image is invalid after the first judgment module judges whether the pre-set image is valid.

Here, it is important to note that the third control module 201 corresponds to Step S202 in embodiment 1, and the module is identical to an example and an application scenario for implementing the corresponding step, but unrestricted to those disclosed in embodiment 1.

In an alternative embodiment, the memory stores a plurality of pre-set images, the plurality of pre-set images include one factory pre-set image and at least one user pre-set image, the user pre-set image can be loaded in and updated by an end-user, and the factory pre-set image is protected by a password.

In an alternative embodiment, the first judgment module 103 includes: a first judgment sub-module 301, configured to judge whether the factory pre-set image and the user pre-set image are valid; the second control module 105 includes a first control sub-module 401, a second control sub-module 403 and a third control sub-module 405, wherein the first control sub-module 401 is configured to control the liquid crystal panel to display the factory pre-set image until the external source image is received when the factory pre-set image is valid and the user pre-set image is invalid; the second control sub-module 403 is configured to control the liquid crystal panel to display the user pre-set image until the external source image is received when the factory pre-set image is invalid and the user pre-set image is valid; the third control sub-module 405 is configured to control the liquid crystal panel to display the user pre-set image until the external source image is received when the factory pre-set image is valid and the user pre-set image is valid.

Here, it is important to note that the first judgment sub-module 301, the first control sub-module 401, the second control sub-module 403 and the third control sub-module 405 correspond to Step S302 and S402 to Step S406 in embodiment 1, and the modules are identical to examples and application scenarios for implementing the corresponding steps, but unrestricted to those disclosed in embodiment 1.

In an alternative embodiment, the second control module 105 includes: a switch module 501, configured to control the liquid crystal panel to switch displaying the pre-set image among the plurality of pre-set images until the external source image is received.

Here, it is important to note that the switch module 501 corresponds to Step S502 in embodiment 1, and the module is identical to an example and an application scenario for implementing the corresponding step, but unrestricted to those disclosed in embodiment 1.

In an alternative embodiment, the device further includes a first confirm module 601 and a fourth control module 603, wherein the first confirm module 601 is configured to confirm a display time of the pre-set image after the second control module 105 controls the liquid crystal panel to display the pre-set image until the external source image is received; the fourth control module 603 is configured to control the liquid crystal panel to display the external source image when the display time of the pre-set image exceeds a preset minimum time.

Here, it is important to note that the first confirm module 601 and the fourth control module 603 correspond to Step S602 to Step S604 in embodiment 1, and the modules are identical to examples and application scenarios for implementing the corresponding steps, but unrestricted to those disclosed in embodiment 1.

In an alternative embodiment, the device further includes a second judgment module 701 and a fifth control module 703, wherein the second judgment module 701 is configured to judge whether the external source image is lost after the fourth control module 603 controls the liquid crystal panel to display the external source image; the fifth control module 703 is configured to control the liquid crystal panel to display the pre-set image when the external source image is lost.

Here, it is important to note that the third judgment module 701 and the fifth control module 703 correspond to Step S702 to Step S704 in embodiment 1, and the modules are identical to examples and application scenarios for implementing the corresponding steps, but unrestricted to those disclosed in embodiment 1.

In an alternative embodiment, the second control module 105 includes a second confirm module 801 and a location change module 803, wherein the second confirm module 801 is configured to confirm a display time of the pre-set image; the location change module 803 is configured to change a display location of the pre-set image on the liquid crystal panel when the display time of the pre-set image exceeds a preset maximum time.

Here, it is important to note that the second confirm module 801 and the location change module 803 correspond to Step S802 to Step S804 in embodiment 1, and the modules are identical to examples and application scenarios for implementing the corresponding steps, but unrestricted to those disclosed in embodiment 1.

Embodiment 3

According to the embodiment of the disclosure, a product embodiment of a terminal is provided. The terminal includes a liquid crystal panel and a pre-programmed memory. The liquid crystal panel includes a timing controller, and the timing controller is connected with the memory. The terminal further includes a first control module 101, a first judgment module 103, a second control module 105 and a processor 10, wherein the first control module 101 is configured to control the timing controller to load a pre-set image from the memory after the liquid crystal panel is powered on; the first judgment module 103 is configured to judge whether the pre-set image is valid; the second control module 105 is configured to control the liquid crystal panel to display the pre-set image until an external source image is received when the pre-set image is valid; the processor 10 is configured to run a program, when the program is running, data output from the first control module 101, the first judgment module 103, the second control module 105 is processed by means of the following steps: first step: controlling a timing controller to load a pre-set image from a pre-programmed memory after the liquid crystal panel is powered on; second step: judging whether the pre-set image is valid; and third step: controlling the liquid crystal panel to display the pre-set image until an external source image is received when the pre-set image is valid.

Embodiment 4

According to the embodiment of the disclosure, a product embodiment of a terminal is provided. The terminal includes a liquid crystal panel and a pre-programmed memory. The liquid crystal panel includes a timing controller, the timing controller being connected with the memory. The terminal further includes a first control module 101, a first judgment module 103, a second control module 105 and a storage medium 20, wherein the first control module 101 is configured to control the timing controller to load a pre-set image from the memory after the liquid crystal panel is powered on; the first judgment module 103 is configured to judge whether the pre-set image is valid; the second control module 105 is configured to control the liquid crystal panel to display the pre-set image until an external source image is received when the pre-set image is valid; the storage medium 20 is configured to store a program, when the program is running, data output from the first control module 101, the first judgment module 103 and the second control module 105 is processed by means of the following steps: first step: controlling a timing controller to load a pre-set image from a pre-programmed memory after the liquid crystal panel is powered on; second step: judging whether the pre-set image is valid; and third step: controlling the liquid crystal panel to display the pre-set image until an external source image is received when the pre-set image is valid.

The sequence numbers of the embodiments of the disclosure are only used for descriptions, and do not represent the preference of the embodiments.

In the abovementioned embodiments of the disclosure, descriptions for each embodiment are emphasized respectively, and parts which are not elaborated in detail in a certain embodiment may refer to relevant descriptions for other embodiments.

In some embodiments provided by the disclosure, it should be understood that the disclosed technical content may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, units or modules, and may be electrical or other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiment according to a practical requirement.

In addition, each function unit in each embodiment of the disclosure may be integrated into a processing unit, each unit may also exist independently, and two or more than two units may also be integrated into a unit. The abovementioned integrated unit may be implemented in a hardware form.

The above is only the preferable implementation mode of the disclosure. It should be pointed out that some improvements and modifications apparent to a person of ordinary skill in the art may also be made without departing from the principle of the disclosure. These improvements and modifications shall fall within the scope of protection of the disclosure.

What is claimed is:

1. A method for displaying an image on a liquid crystal panel, comprising:
controlling a timing controller to load a pre-set image from a pre-programmed memory after the liquid crystal panel is powered on, wherein the liquid crystal panel comprises the timing controller, the timing controller is connected with the memory;
judging whether the pre-set image is valid; and
controlling the liquid crystal panel to display the pre-set image until an external source image is received when the pre-set image is valid;
wherein the pre-set image is a certain identifier which makes the liquid crystal panel be configured to indicate an error situation or used as a power indicator, and the memory stores a plurality of pre-set images, the plurality of pre-set images comprise one factory pre-set image and at least one user pre-set image, the user pre-set image can be loaded in and updated by an end-user, and the factory pre-set image is protected by a password.

2. The method as claimed in claim 1, after judging whether the pre-set image is valid, the method further comprising:
controlling the liquid crystal panel to display a black screen until the external source image is received when the pre-set image is invalid.

3. The method as claimed in claim 1, wherein judging whether the pre-set image is valid comprises:
judging whether the factory pre-set image and the user pre-set image are valid;
controlling the liquid crystal panel to display the pre-set image until the external source image is received when the pre-set image is valid comprises:
controlling the liquid crystal panel to display the factory pre-set image until the external source image is received when the factory pre-set image is valid and the user pre-set image is invalid;
controlling the liquid crystal panel to display the user pre-set image until the external source image is received when the factory pre-set image is invalid and the user pre-set image is valid;
controlling the liquid crystal panel to display the user pre-set image until the external source image is received when the factory pre-set image is valid and the user pre-set image is valid.

4. The method as claimed in claim 1, wherein controlling the liquid crystal panel to display the pre-set image until the external source image is received comprises:
controlling the liquid crystal panel to switch displaying the pre-set image among the plurality of pre-set images until the external source image is received.

5. The method as claimed in claim 1, after controlling the liquid crystal panel to display the pre-set image until the external source image is received, the method further comprising:
confirming a display time of the pre-set image;
controlling the liquid crystal panel to display the external source image when the display time of the pre-set image exceeds a preset minimum time.

6. The method as claimed in claim 5, after controlling the liquid crystal panel to display the external source image, the method further comprising:
judging whether the external source image is lost;
controlling the liquid crystal panel to display the pre-set image when the external source image is lost.

7. The method as claimed in claim 1, wherein controlling the liquid crystal panel to display the pre-set image until the external source image is received comprises:
confirming a display time of the pre-set image;
changing a display location of the pre-set image on the liquid crystal panel when the display time of the pre-set image exceeds a preset maximum time.

8. A device for displaying an image on a liquid crystal panel, comprising: the liquid crystal panel and a pre-programmed memory, wherein, the liquid crystal panel comprising a timing controller, the timing controller being connected with the memory, the device further comprising:
a first control module, configured to control the timing controller to load a pre-set image from the memory after the liquid crystal panel is powered on;
a first judgment module, configured to judge whether the pre-set image is valid; and
a second control module, configured to control the liquid crystal panel to display the pre-set image until an external source image is received when the pre-set image is valid;
wherein the pre-set image is a certain identifier which makes the liquid crystal panel be configured to indicate an error situation or used as a power indicator, and the memory stores a plurality of pre-set images, the plurality of pre-set images comprise one factory pre-set image and at least one user pre-set image, the user pre-set image can be loaded in and updated by an end-user, and the factory pre-set image is protected by a password.

9. The device as claimed in claim 8, further comprising:
a third control module, configured to control the liquid crystal panel to display a black screen until the external source image is received when the pre-set image is invalid after the first judgment module judges whether the pre-set image is valid.

10. The device as claimed in claim 8, wherein the first judgment module comprises: a first judgment sub-module, configured to judge whether the factory pre-set image and the user pre-set image are valid;
the second control module comprises:
a first control sub-module, configured to control the liquid crystal panel to display the factory pre-set image until the external source image is received when the factory pre-set image is valid and the user pre-set image is invalid;
a second control sub-module, configured to control the liquid crystal panel to display the user pre-set image until the external source image is received when the factory pre-set image is invalid and the user pre-set image is valid;
a third control sub-module, configured to control the liquid crystal panel to display the user pre-set image until the external source image is received when the factory pre-set image is valid and the user pre-set image is valid.

11. The device as claimed in claim 8, wherein the second control module comprises:
a switch module, configured to control the liquid crystal panel to switch displaying the pre-set image among the plurality of pre-set images until the external source image is received.

12. The device as claimed in claim 8, further comprising:
a first confirm module, configured to confirm a display time of the pre-set image after the second control module controls the liquid crystal panel to display the pre-set image until the external source image is received;
a fourth control module, configured to control the liquid crystal panel to display the external source image when the display time of the pre-set image exceeds a preset minimum time.

13. The device as claimed in claim 12, further comprising:
a second judgment module, configured to judge whether the external source image is lost after the fourth control module controls the liquid crystal panel to display the external source image;
a fifth control module, configured to control the liquid crystal panel to display the pre-set image when the external source image is lost.

14. The device as claimed in claim 8, wherein the second control module comprises:
a second confirm module, configured to confirm a display time of the pre-set image;
a location change module, configured to change a display location of the pre-set image on the liquid crystal panel when the display time of the pre-set image exceeds a preset maximum time.

* * * * *